July 1, 1958 P. HALPERT ET AL 2,841,345
GLIDE PATH SYSTEM WITH FLARE OUT
Filed Jan. 15, 1952 2 Sheets-Sheet 1
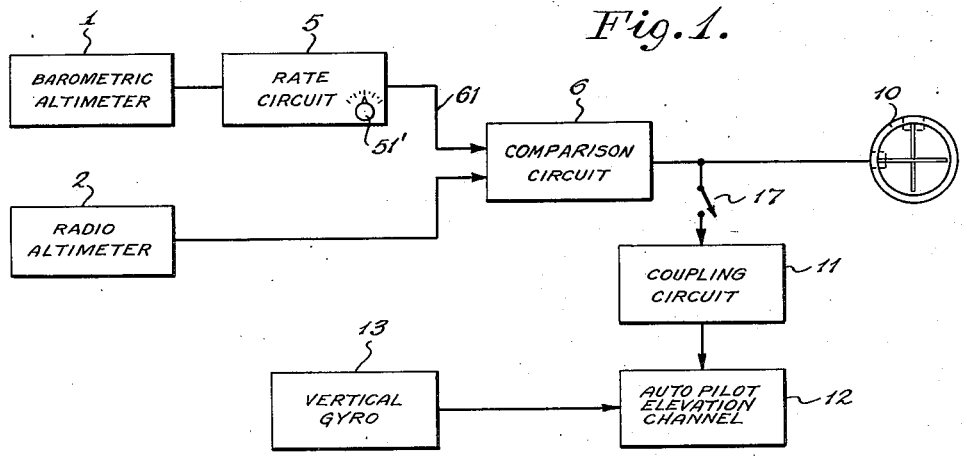
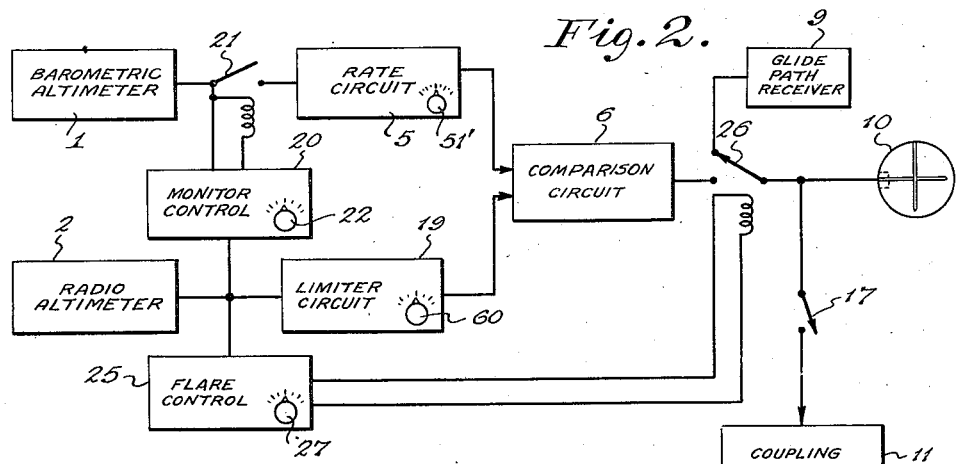
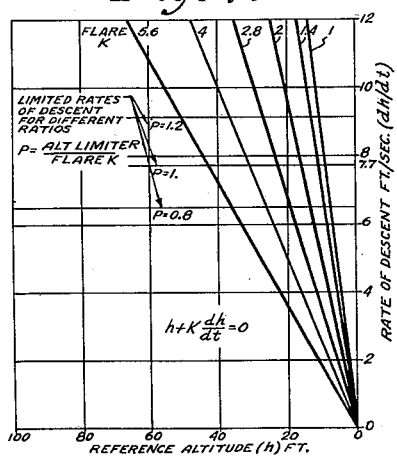
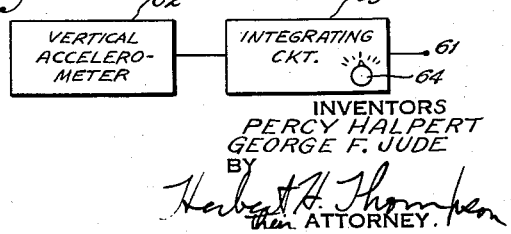
INVENTORS
PERCY HALPERT
GEORGE F. JUDE
BY
Herbert H. Thompson
their ATTORNEY.

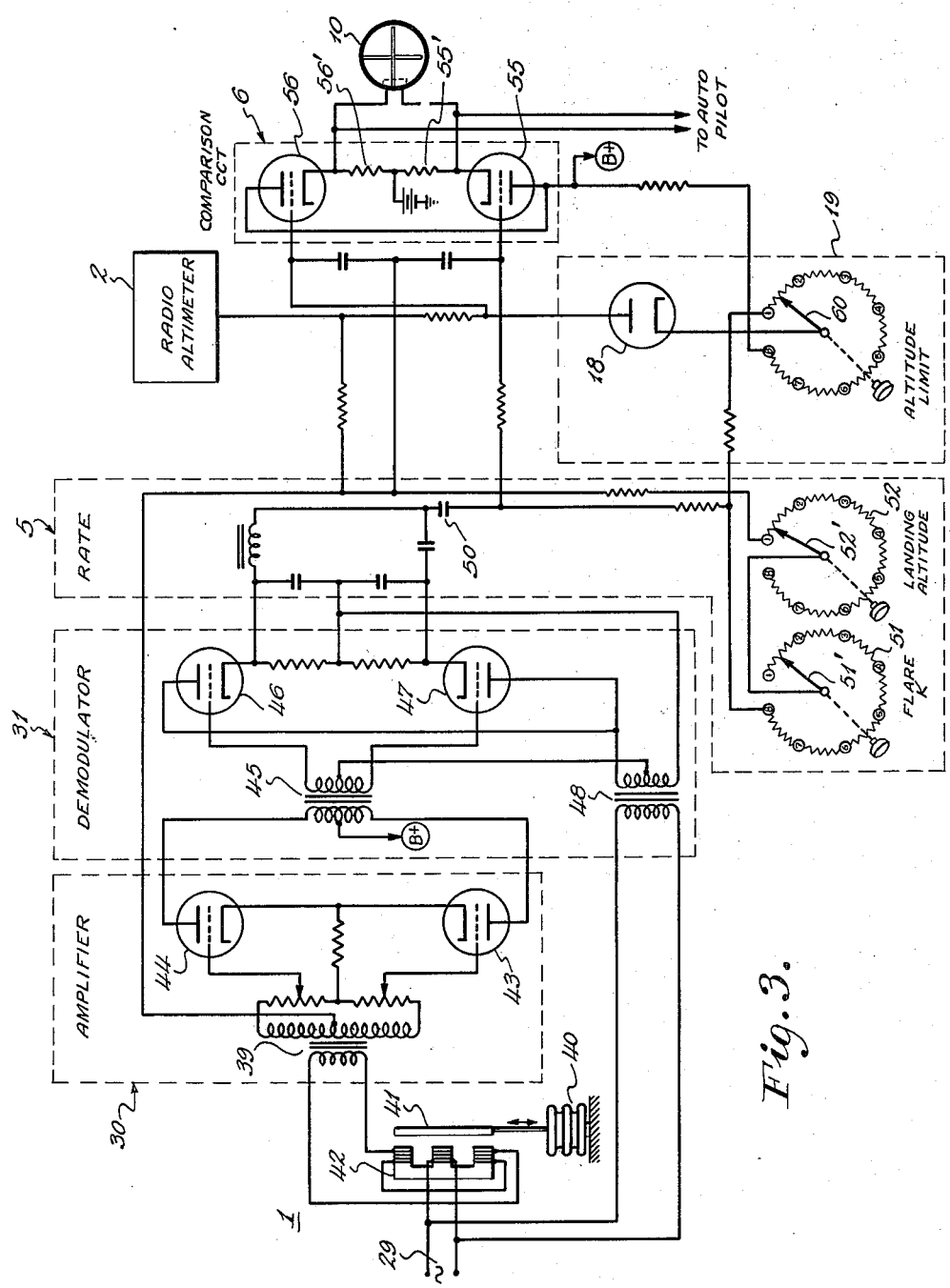

United States Patent Office 2,841,345
Patented July 1, 1958

2,841,345

GLIDE PATH SYSTEM WITH FLARE OUT

Percy Halpert, Hempstead, and George F. Jude, Richmond Hill, N. Y., assignors to Sperry Rand Corporation, a corporation of Delaware Application January 15, 1952, Serial No. 266,456

22 Claims. (Cl. 244—77)

This invention relates to radio control landing apparatus for aircraft and more particularly to means for providing a smooth glide path.

In aircraft instrument landing systems there is generally provided a radio beam glide path to define a descending path for the plane to follow in order to touch down on the runway. Conventional apparatus provides a glide path which is essentially a straight line intersecting the horizontal runway at an appreciable angle. It has been found that this straight glide path brings the plane into contact with the earth with too great a shock. Therefore, it is desirable to "flare out" the slope of the glide path as it closely approaches the earth so that it does not intersect the runway at an angle of several degrees but rather approaches the runway in a smooth manner resembling an asymptotic curve.

This result may be achieved by providing a glide path having a flared out exponential type curve which is asymptotic to a reference line slightly below the runway.

The present invention provides this exponential flare out path by providing altitude in formation and rate of change of altitude information from two independent sources and combining them to provide the desired guidance signal. The combined altitude signal provides an exponential glide path which is a substantial smooth approach to the runway.

Accordingly, a principal object of the invention is to provide new and improved radio controlled landing apparatus.

Another object is to provide new and improved instrument landing apparatus for aircraft;

Another object is to provide a new and improved apparatus for providing an exponential glide path;

Another object of the invention is to provide new and improved apparatus for automatically landing an aircraft according to an exponential glide path.

These and other objects of the invention will be apparent from the following specification and figures of which, Fig. 1 is a schematic block diagram of an embodiment of the invention, Fig. 2 is a schematic diagram of another embodiment of the invention, Fig. 3 is a schematic diagram of an embodiment of the invention, Fig. 4 is a graph illustrative of several parameters pertinent to the invention, and Fig. 5 is a schematic diagram of a vertical accelerometer and integrating circuit which may be used to derive a signal proportional to the rate of change of altitude.

The present invention is not meant to supplant existing glide path systems but rather to complement them. The system of the present invention is only intended to operate for about the last 100 feet of descent. Existing glide path apparatus providing a straight line glide path at an angle of 2½° is satisfactory except for approximately the last 100 to 150 feet of descent, at which time the apparatus of the present invention is substituted for the conventional glide path apparatus. A conventional glide path system is shown in Moseley Patent 2,423,337 granted July 1, 1947.

According to our invention we employ both an altitude signal, and an independently derived rate of change of altitude signal for controlling approximately the last 100 feet of descent, which signals are combined in such a manner as to cause an asymptotic approach to the ground. We prefer to obtain them from two different altitude measuring devices having the better characteristics for the purpose employed. Preferably, we obtain the rate of change of altitude from a barometric altimeter, as it is less sensitive to irregular objects on the ground such as trees, houses, factories, etc. and therefore is more suited to give a proper rate of change of altitude signal as the craft descends. Inasmuch as the solution of the landing problem requires only the rate of change of altitude to be obtained with reference to the runway rather than to objects to one side thereof, the barometric altimeter is preferable for measuring the rate of change of altitude. However, for obtaining the primary altitude signal itself (the absolute altitude) we prefer to employ a radio altimeter since it is much more accurate when close to the ground than the barometric altimeter and is not subject to calibration for airport elevation above sea level and error due to variations of atmospheric pressure.

Therefore, the system of the present invention combines two separate flight path measuring devices in a novel manner, the radio altitude device reads absolute altitude above the terrain and therefore determines the absolute altitude quite accurately. The rate signal is independently obtained from the barometric altimeter which is noise-free and continuous over the limited range involved in the landing problem, although it is not suited for an accurate measure of absolute altitude. The present invention combines the advantages of two independent measuring devices in a particular manner to achieve the above stated objects.

Fig. 1 illustrates a block diagram of an embodiment of the invention principally comprising a barometric altimeter 1, and a radio altimeter 2. The barometric altimeter is connected to a rate circuit 5 which may be a differentiating circuit, which provides a rate of change of altitude signal to the comparison circuit 6. The comparison circuit 6 combines the altitude signal and the rate of change of altitude signal according to the following relation $$H + \frac{K dH}{dt} = 0$$

or $$\frac{dH}{dt} = -\frac{H}{K}$$

where $H$ = the absolute altitude above the ground, and $K$ = a sensitivity constant.

The radio altimeter 2 supplies a voltage proportional to H while the barometric altimeter in combination with the rate circuit supplies the term $$\frac{dH}{dt}$$

The value K determines the curvature of the exponential path and K is chosen by a selector switch 51'. The rate decreases as the height decreases to provide a smooth touchdown for the craft.

The differential output from comparison circuit 6 may be used to energize a meter 10 preferably of the cross-pointer type to provide a visual aid for manual flight control. The differential output from comparison circuit 6 may be also connected by a switch 17 to an automatic pilot apparatus 12 through a coupling circuit 11 for completely automatic flight control. Coupling 11 is to adapt the comparison circuit output to the automatic pilot 12, and may contain suitable amplifiers and integrating means, depending on the requirements of the automatic pilot 12, in a particular installation. Vertical reference is provided by vertical gyro 13. Conventional automatic pilot apparatus is shown in Halpert Patent 2,511,846 granted June 30, 1950.

Figure 2 illustrates an embodiment of the invention which is basically the same as that of Figure 1, but which is adapted for automatic operation. In the conventional glide path operation, the craft is guided in elevation by the radio glide path receiver 9. As the craft descends to an altitude of approximately 150 feet, the flare out system of the present invention is put into operation. This switchover may be initiated by relay circuits which are responsive to the radio altimeter 2.

Referring to Figure 2, a monitor control 20 is responsive to the radio altimeter 2 and adapted to connect the output of the barometric altimeter 1 into the system by means of relay 21. The monitor control circuit 20 receives an output from the radio altimeter 2 which is proportional to the altitude. The monitor control may comprise a bias circuit which is adapted to be triggered as the altitude signal from altimeter 2 approaches a certain value, which may be selected by calibrated selector switch 22.

A second control circuit, called the flare control 25, is also responsive to the radio altimeter 2 and is adapted to connect the output of the entire flare out circuit to the cross pointer meter 10 and the automatic pilot by means of the relay 26.

The monitor control 20 is preferably set to energize the relay 21 at an altitude of about 150 feet so as to energize the rate circuit 5, and enable the flare out circuit to be in condition for being connected to the automatic pilot.

The flare control 25 is preferably adapted to trigger at an altitude of approximately 100 feet by means of selector switch 27 so as to connect the exponential flare out circuit into the craft control system. At the same time, of course, the control signal from the glide path receiver 9 must be disconnected from the automatic pilot. The embodiment of Fig. 2 also contains a limiter circuit 19, having a selector switch 60, the purpose of which will be explained hereafter.

Figure 3 illustrates a schematic diagram of an embodiment of the invention. It comprises generally the barometric altimeter 1, radio altimeter 2, amplifier 30, a demodulator 31, a rate circuit 5, limiting circuit 19, and comparison circuit 6.

The barometric altimeter may be conventional, for instance, of the type described in Meston Patent Number 2,446,546 granted August 10, 1948. It generally comprises a pressure responsive bellows system 40 which moves the soft iron pole piece 41 proportionally to atmospheric pressure and therefore provides a measure of altitude. The movement of the bellows is detected by an E type pickoff 42 which is conventional and is also shown in the above-mentioned Meston patent. The center portion of the E pickoff 43 is energized with an alternating voltage from source 29 which is magnetically coupled to the outer portions of the pickoff according to the position of the pole piece 41. The outer windings of the pickoff are wound so as to provide signals which are 180° out of phase with each other. The output of the pickoff therefore is a signal which is in phase or out of phase with the reference voltage depending on the direction of travel of the pole piece 41, and the magnitude of this output signal is proportional to the travel.

This signal is applied to amplifier 30 through transformer 39 where it is amplified by balanced amplifier stages 43 and 44. The signal is then connected by transformer 45 to the phase detector demodulator comprising tubes 46 and 47. The phase reference voltage is obtained from the same source 29 as that applied to the E pickoff and is applied through the transformer 48 to the plates of the demodulator tubes 46 and 47. The signal is applied in opposite phase to the grids of tubes 46 and 47. Therefore, the tube in which the plate and grid voltages are in phase will conduct whereas the other tube will be cut off, thereby providing a direct voltage output which has a polarity in accordance with the sense of the signal and a magnitude proportional to that of the signal. In other words, the barometer signal is converted to a direct current signal.

The barometric signal is now applied to the rate circuit 5 which is a differentiating circuit comprising condenser 50 and calibrated resistors 51 and 52 connected in series. The value of the resistance in the differentiating rate circuit determines the curvature of the flare out glide path and may be selected by setting the calibrated switch 51' which is known as the flare K since it determines the value of constant K in the above-mentioned equation defining the flare out glide path. The series resistor 52 is also calibrated and provides a landing altitude reference level which may be selected by means of the selector switch 52'. The altitude reference is generally chosen a few feet below the ground level so that as the plane approaches the reference level asymptotically it will have a small but definite downward velocity as it touches down on the runway. The barometric rate voltage from rate circuit 5 is connected to the grid of tube 55 in the comparison circuit 6.

The radio altimeter signal from the radio altimeter 2 is connected to the grid of the other tube 56 of the comparison circuit 6. The radio altimeter voltage is also connected to a limiting circuit 19 which comprises a diode 18, the cathode of which is biased by a calibrated potentiometer 60. The purpose of the limiting circuit 19 is to limit the rate of descent by limiting the altitude signal in the equation $$H + K\frac{dH}{dt} = 0$$

Therefore, the comparison circuit 6 compares the radio altitude voltage with the barometric rate of change of altitude voltage. These voltages are developed in the cathode resistors 55' and 56' of the vacuum tubes 55 and 56 and the difference of these voltages is taken across the cathode resistors and applied to the output leads. This output may be connected to a cross pointer meter 10 for manual operation or directly to an automatic pilot for automatic operation.

The operation of the embodiment of Figure 3 may be summed up as follows: An alternating voltage, barometric altitude signal is taken, by means of an E pickoff, and is amplified and demodulated to provide a direct current signal. This signal is applied to a rate circuit which provides the rate of change of altitude to one portion of a comparison circuit. Absolute altitude signal is taken from the radio altimeter, limited, and applied to the other portion of the comparison circuit. The differential output of the comparison circuit provides a signal which is proportional to a flare out glide path pattern according to the operational equation previously discussed. The comparison circuit output is the difference between radio altimeter and barometric rate of descent signals, which difference will tend toward zero as the aircraft descends in accordance with the flare out path called for by the signals.

The settings of the selector switches 51' and 60 will now be discussed in connection with Figure 4. Figure 4 is a graph of altitude versus rate of descent for various values of K, which is the constant term of the operational equation. The value of K is chosen by setting the selector switch 51', and it varies the curvature of the flight path.

The setting for the altitude limit switch 60 is illustrated by the following example. Assuming a true airspeed of 120 M. P. H. and a 2½° glide path, the rate of descent along the glide path beam would be a constant 7.7 feet per second. If K in the equation equals 4 and the rated $$\frac{dH}{dt}$$

is made equal to 7.7, the altitude H in the equation would be approximately 30 feet, as shown in Fig. 4. Therefore, at an altitude of approximately 30 feet, the rate of descent due to the glide path beam is equal to that of the flare out equation. At altitudes above this, the rate according to the flare out equation would be higher than 7.7 feet. Therefore, it is desirable to start the flare out operation when the glide path rate is equal to the flare out rate, namely, approximately 30 feet, and this is done by setting the altitude limit switch 60 so that flare out rates above this point are limited to the glide path rate.

Therefore, there is a smooth transition from glide path to flare out control. The initial flare out rates are limited to the glide path rate, and at the 30 feet altitude the rate starts to decrease smoothly due to the flare out.

The altitude to which the limiting should be adjusted will vary depending on the flare K selected on switch 51′, on the glide slope angle, and on the airspeed. The ratio between altitude limiter setting on switch 60 and flare K setting on switch 51′ is designated as P in Figure 4. A 2½° glide slope and a 120-M. P. H. airspeed are assumed as normal conditions corresponding to a vertical speed of 7.7 feet per second, and a setting $P=1$ is used. For rates of descent differing from this speed by more than ten percent, the altitude limiter selector switch 60 should be set to values proportionally higher or lower than the flare K setting as shown in Figure 4 at the lines $P=1.2$ or .8. Knowledge of the altitude at which the limiter is adjusted, while not necessary for operation of the equipment, may be of interest in evaluating performance. These values are shown in Figure 4. As an example, consider an airplane in a 2.5-degree glide path with a true airspeed of 120 M. P. H. which will produce a rate of descent of 7.7 feet per second. If flare K and altitude limiter selector switches are set so as to have a ratio of 2.8 ($P=1$), the rate of descent of 7.7 feet per second will continue to an altitude of 21.6 feet, where the glide path rate of descent intersects the $K=2.8$ line. At this point the rate of descent begins to reduce linearly with altitude in accordance with the selected flare K.

Therefore, the present invention provides a system for automatically guiding an aircraft in elevation so as to provide a smooth flare out path, during approximately the last 100 feet or less of descent. The system of the present invention does not supplant conventional glide path apparatus, but only substitutes for it during the last 100 feet of descent in order to provide a more desirable flight path having an exponential curvature. The automatic pilot components and the altimeters may be conventional. Separate altimeters are used in order to provide an instantaneous value and also an independent long term reference. It has been found undesirable to attempt to obtain a rate signal from the same source as the principal signal. In particular, a rate signal from a radio altimeter is not desirable because of a considerable amount of noise caused by variable reflections from irregular terrain and objects, such as houses, trees and vehicles. The rate signal may be obtained from other sources than an altimeter so long as these sources provide a signal indicative of the general trend of vertical descent of the craft and are not responsive to minute changes in the actual height of the aircraft due to changes in topography as is the case in a radio altimeter. For instance a vertical accelerometer and integrator operated thereby could be used for providing a rate signal. Vertical accelerometers are shown in Esval Patent No. 2,553,560 granted May 22, 1951.

Fig. 5 shows a vertical accelerometer 62 and an integrating circuit connected to receive the vertical accelera-tion signal. Such an arrangement may be used in the apparatus of Fig. 1, for instance, in place of the barometric altimeter 1 and the rate circuit 5. By disconnecting components 1 and 5 of Fig. 1 and connecting terminal 61 of Fig. 5 to terminal 61 of Fig. 1, an alternative embodiment is provided in which the acceleration signal produced by the vertical accelerometer 62 is integrated in integrating circuit 63, which may be a conventional and well-known RC network, for instance.

It is apparent that when the aircraft undergoes vertical acceleration, an appropriate velocity signal will be produced by the integrating circuit 63. When, however, there is a steady rate of descent such as might be effected by flying a linear glide path descent, there is no acceleration signal from the vertical accelerometer 62 and hence no output signal from the integrating circuit 63, though a vertical velocity is present. To provide for this situation, the integrating circuit has an adjustment by which a constant signal may be added to the output of the integrating circuit 63. By adjusting the knob 64, the output of the integrating circuit 63 may be so modified.

In actual practice, the pilot of an aircraft would observe the rate of descent and adjust knob 64 so that the constant component of the integrating circuit signal is proportional to and representative of the linear glide path slope. This constant value signal is comparable to the constant term which evolves from mathematical integration. That is to say that when the aircraft flies a glide path of constant rate of descent, the vertical acceleration equals zero, but the output of the integrating circuit should be equal to the glide path rate of descent. This term is put into the integrating circuit 63 by adjustment of the calibrated knob 64 to the proper value.

One novel aspect of this system relates to the use of two separate altitude responsive devices. A radio altitude device reads absolute altitude above the terrain and, therefore, locates the runway in elevation quite accurately. Inherent in all known available radio altimeters, however, are two factors, namely, noise due to electrical or topographical irregularties and a discontinuous measurement of altitude which severely limit the usefulness of this device as a control means. Barometric altitude devices, on the other hand, can be made continuous and quite noise-free over the limited range involved in the landing problem although no accurate measure of absolute altitude is available from them. Therefore, the present system combines the advantages of two measuring devices to obtain a number of desirable characteristics.

The system of the present invention discriminates against noise in a way that avoids undesirable time delay, by providing a separate independent reference to which the principal signal is referred.

The system of the present invention is not limited to landing operations only, but may be used, for instance, in changing from one altitude to another selected altitude.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Landing control means for an aircraft comprising, an altimeter of the radio reflection type for producing a signal proportional to the substantially instantaneous absolute altitude of the aircraft above the terrain, means independent of said radio altimeter for producing a signal proportional to the rate of change of altitude of said aircraft, means for comparing said absolute altitude signal with said rate signal, and means responsive to the difference between said two signals for enabling said aircraft to be controlled in a manner to maintain said difference substantially zero whereby said aircraft may be directed to follow a substantially asymptotic flare-out flight path to said landing.

2. Apparatus as set forth in claim 1 wherein said altitude rate signal producing means includes a barometric altimeter.

3. Apparatus as set forth in claim 1 wherein said altitude rate signal producing means includes signal means responsive to vertical accelerations of said aircraft and means for integrating the signal produced thereby.

4. Apparatus as set forth in claim 1 wherein said last-mentioned means includes automatic pilot means responsive to the difference between said two signals.

5. Apparatus as set forth in claim 1 when said last-mentioned means includes a meter having a pointer deflectable from a zero position in accordance with the difference between said two signals whereby the pilot, by manually controlling the craft to maintain said pointer at said zero position will cause the craft to follow said flare-out flight path.

6. Apparatus for guiding an aircraft through a flare-out landing pattern comprising, a radio altimeter for producing a signal proportional to the absolute altitude of said aircraft above the terrain, a barometric altimeter, differentiating means connected to said barometric altimeter for obtaining a rate of change of altitude signal therefrom, comparison means connected to receive said radio altimeter signal and said rate signal for providing a measure of the difference therebetween, and means responsive to said difference measure for enabling said aircraft to be controlled so as to maintain said difference measure zero, whereby said aircraft may be directed on a substantially asymptotic flight path to said landing.

7. Apparatus for guiding an aircraft through a flare-out landing pattern comprising, a first altimeter of the radio reflection type for producing a signal proportional to the absolute altitude of said aircraft above the terrain, a second altimeter of the pressure type for producing a signal proportional to altitude of the aircraft, rate signal generator means connected to receive said second altimeter signal for producing a signal proportional to the rate of change thereof, limiting means connected to receive said first altimeter output and adapted to selectably limit the magnitude of said first altimeter signal whereby to limit said altitude rate signal when said craft is controlled in accordance with the difference between said radio altitude and altitude rate signals, comparison means connected to receive said first altimeter signal and said rate signal for producing a measure of the difference therebetween, and means responsive to said difference measure for enabling said craft to be controlled in a manner to maintain said difference measure zero whereby said craft may be directed on a linear descent at altitudes at which said first altimeter signal is limited, and on a substantially asymptotic flight approach below said limiting altitude.

8. In an aircraft guidance system, means for obtaining a signal proportional to the substantially instantaneous absolute vertical displacement of the craft above the terrain, means independent of said last-mentioned means for obtaining a signal proportional to the rate of change of altitude of said craft, and means connected to receive said signals for supplying an output proportional to the difference therebetween.

9. In an aircraft guidance system, radio altimeter means for generating a signal proportional to the substantially instantaneous absolute height of the craft above the terrain, barometric altimeter means, a rate circuit for obtaining a signal proportional to the rate of change of altitude of said craft as detected by said barometric altimeter, and means connected to receive said signals for supplying an output proportional to the difference therebetween.

10. In an aircraft guidance system, means for generating a signal proportional to the substantially instantaneous vertical displacement of the craft with respect to the terrain, accelerometer means for producing a signal proportional to the vertical acceleration of said craft, integrating means connected to receive said last-named signal for obtaining a signal proportional to the rate of change of altitude of said craft, and means connected to receive said altitude and said rate of change of altitude signals for supplying an output proportional to the difference therebetween.

11. Apparatus as set forth in claim 10 wherein said integrating means includes means for setting its output signal at a selectable, predetermined value.

12. Apparatus by means of which an aircraft may be guided asymptotically to approach an aircraft runway comprising means for supplying a signal proportional to the altitude of the aircraft, means for supplying a signal proportional to the rate of change of altitude, means for algebraically combined said signals in accordance with the mathematical expression $$H + K\frac{dH}{dt}$$

and for supplying an output signal proportional to the algebraic sum thereof, where H is the altitude, $$\frac{dH}{dt}$$

is the rate of change of altitude, and K is a constant, and means for selecting and varying the value of K at will during operation of the craft in accordance with said output signal whereby to vary the curvature of the asymptotic approach along which the craft is being guided.

13. Apparatus by means of which an aircraft may be guided asymptotically to approach an aircraft runway comprising means for supplying a signal proportional to the altitude of the aircraft, means for supplying a signal proportional to the rate of change of altitude, means for algebraically combining said signals in accordance with the mathematical expression $$H + K\frac{dH}{dt}$$

and for supplying an output signal proportional to the algebraic sum thereof, where H is the altitude, $$\frac{dH}{dt}$$

is the rate of change of altitude, and K is a constant, and means for limiting the value of H to a predetermined maximum value whereby the aircraft when controlled in accordance with said output signal may be guided to follow a linear approach path having a constant rate of descent for values of H greater than said limited value and an asymptotic approach path for values of H less than said limited value.

14. Apparatus by means of which an aircraft may be guided asymptotically to approach an aircraft runway comprising means for supplying a signal proportional to the altitude of the aircraft, means for supplying a signal proportional to the rate of change of altitude, means for algebraically combining said signals in accordance with the mathematical expression $$H + K\frac{dH}{dt}$$

and for supplying an output signal proportional to the algebraic sum thereof, where H is the altitude, $$\frac{dH}{dt}$$

is the rate of change of altitude, and K is a constant, means for selecting and varying the value of K at will during operation of the craft in accordance with said output signal whereby to vary the curvature of the asymptotic approach along which the craft is being guided, and means for selectively limiting the value of H to a predetermined maximum value whereby the aircraft when controlled in accordance with said output signal may be guided to follow a linear approach path having a constant rate of descent determined by the selected value of K for values of H above said limited value and said asymptotic approach path for values of H less than said limited value.

15. Apparatus by means of which an aircraft may be guided to approach and land on an aircraft runway comprising first craft guidance means for enabling said craft to be controlled to follow a first portion of an approach path which is substantially linear and makes a predetermined slope with respect to said runway, a second craft guidance means for enabling said craft to be controlled to follow a second portion of said approach path which is substantially asymptotic to said runway, said second craft guidance means including means for supplying a signal proportional to the altitude of the aircraft, means for supplying a signal proportional to the rate of change of altitude, means for algebraically combining said signals in accordance with the mathematical expression $$H + K\frac{dH}{dt}$$

and for supplying an output signal proportional to the algebraic sum thereof, where H is the altitude, $$\frac{dH}{dt}$$

is the rate of change of altitude, and K is a constant the value thereof being such that the instantaneous slope of said second portion of said approach path is the same as the predetermined slope of said linear portion at a predetermined value of H, means for limiting the maximum value of H to said predetermined value whereby for values of H above said limited value thereof the second portion of said flight path is linear and substantially coincident with said first portion when said craft is controlled in accordance with the output signal of said second craft guidance means, and means for enabling said craft to be guided alternately by said first and second craft guidance means.

16. Apparatus by means of which an aircraft may be guided to approach and land on an aircraft runway comprising first craft guidance means for enabling said craft to be controlled to follow a first portion of an approach path which is substantially linear and makes a predetermined slope with respect to said runway, a second craft guidance means for enabling said craft to be controlled to follow a second portion of said approach path which is substantially asymptotic to said runway, said second craft guidance means including means for supplying a signal proportional to the altitude of the aircraft, means for supplying a signal proportional to the rate of change of altitude, means for algebraically combining said signals in accordance with the mathematical expression $$H + K\frac{dH}{dt}$$

and for supplying an output signal proportional to the algebraic sum thereof, where H is the altitude, $$\frac{dH}{dt}$$

is the rate of change of altitude, and K is a constant, means for selecting the value of K such that at a predetermined altitude the instantaneous slope of the second portion of said approach path is substantially equal to the predetermined slope of the first portion of said approach path at a predetermined value of H, and means for selectively limiting the maximum value of H to said predetermined value whereby for values of H above said limited value thereof the second portion of said flight path is linear and substantially coincident with said first portion when said craft is controlled in accordance with the output signal of said second craft guidance means, and means for enabling said craft to be guided alternately by said first and second craft guidance means.

17. Apparatus as set forth in claim 16 wherein said last-mentioned means comprises means including altitude responsive means and switch means controlled thereby.

18. Apparatus as set forth in claim 16 wherein said first and second craft guidance means includes an automatic pilot for automatically guiding said aircraft along said approach path.

19. Apparatus as set forth in claim 16 wherein said first and second craft guidance means includes a visual indicator having a pointer normally aligned with an index and by so controlling said craft as to maintain said pointer aligned with said index, the pilot will guide the aircraft along said approach path.

20. Apparatus as set forth in claim 16, wherein said first portion of said approach path is defined by a glide slope radio beam.

21. Apparatus as set forth in claim 16 wherein said signal proportional to H is derived from a radio altimeter and wherein said component signal proportional to $$\frac{dH}{dt}$$

is derived from a barometric altimeter.

22. Apparatus as set forth in claim 16 wherein said signal proportional to $$\frac{dH}{dt}$$

is derived from signal means responsive to vertical accelerations of said aircraft, and means for integrating the signal produced thereby.

References Cited in the file of this patent

UNITED STATES PATENTS

| | | |
|---|---|---|
| 2,134,132 | Koster | Oct. 25, 1938 |
| 2,423,337 | Moseley | July 1, 1947 |
| 2,536,683 | Germaix | Jan. 2, 1951 |
| 2,548,278 | Wirkler | Apr. 10, 1951 |
| 2,558,850 | Hofstadter | July 3, 1951 |
| 2,613,352 | Kellogg | Oct. 7, 1952 |
| 2,627,384 | Esval | Feb. 3, 1953 |
| 2,648,041 | Perkins | Aug. 4, 1953 |
| 2,651,015 | Meredith | Sept. 1, 1953 |